United States Patent

[11] 3,614,606

| [72] | Inventors | John A. Schmidt<br>Middleton;<br>Donald W. Kerst, Madison, both of Wis. |
|---|---|---|
| [21] | Appl. No. | 813,449 |
| [22] | Filed | Apr. 4, 1969 |
| [45] | Patented | Oct. 19, 1971 |
| [73] | Assignee | The United States of America as represented by the United States Atomic Energy Commission |

[54] CAPACITIVE-COUPLED PROBE FOR MEASURING POTENTIALS IN A PLASMA
2 Claims, 2 Drawing Figs.

[52] U.S. Cl. .................................................... 324/61 R,
317/246, 324/33
[51] Int. Cl. ..................................................... G01v 27/26
[50] Field of Search........................................... 313/217,
271, 315, 318, 344, 314, 317; 324/61 P, 71, 33,
72.5, 126, 149; 317/246

[56] References Cited
UNITED STATES PATENTS
2,802,178  8/1957  Shafer et al. ................ 324/61
2,825,872  3/1958  Stubbs et al. ................ 324/71
3,109,882  11/1963  Maltby ........................ 317/246
FOREIGN PATENTS
744,326  2/1956  Great Britain................ 324/72.5
OTHER REFERENCES
Lyles, M. E. " Low-Noise Preamplifier Gives High-Input Impedance" Electronic Design. Nov. 22, 1963. TK 7800 E51, pp. 71– 72.
Frese, Jr. S. J. Electrostatic Flex Probe in IBM Technical Disclosure Bulletin. Vol. 6 No. 5, Oct. 1963. TK 7800. I13.

*Primary Examiner*—Edward E. Kubasiewicz
*Attorney*—Roland A. Anderson

ABSTRACT: A capacitive-coupled probe includes an elongated glass tube closed at one end thereof and an electrode mounted within the glass tube at the closed end. A conductor extends within the tube along the length thereof to contact the electrode and a shield is disposed about the conductor with a dielectric material interposed of the shield and the conductor for insulation purposes. The conductor and electrode are sized with respect to the interior of the tube to restrain relative motion therebetween.

PATENTED OCT 19 1971  3,614,606

Inventors
John A. Schmidt
Donald W. Kerst
Attorney

3,614,606

CAPACITIVE-COUPLED PROBE FOR MEASURING POTENTIALS IN A PLASMA

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The measurement of floating potentials in a plasma requires a probe having a high input impedance, small size and broad bandwidth. Probe size is important in potential measurements, because physical obstructions in the contained plasma disturb the equilibrium and therefore generate fluctuations within the plasma. The fluctuations so generated are difficult to distinguish from those arising from plasma instabilities and hinder measurements on such instabilities.

A typical probe presently used for plasma potential measurements is described by J. C. Sprott in the Review of Scientific Instruments, Vol. 37, No. 7, July 1966. Such a probe embodies a resistor in series with a probe-tip electrode in contact with the plasma being measured. This type of probe has been observed to cause fluctuations in plasmas due to its size which is limited by the physical dimensions of the resistor. Further, the input impedance of the probe is limited at high frequencies by the capacitance between the resistor and the shield on the electrode side of the resistor together with the capacitance of the resistor itself. The high-frequency response of the probe is limited by the difficulty of balancing out the distributed capacitance across the resistor.

Accordingly, it is one object of the present invention to provide an improved probe and apparatus for measuring the potential of a plasma.

It is another object of the present invention to provide an improved probe for measuring the potential of a plasma, which probe is characterized by high input impedance.

It is another object of the present invention to provide an improved probe for measuring the potential of a plasma, which probe is characterized by small size.

It is another object of the present invention to provide an improved probe for measuring the potential of a plasma, which probe is characterized by broad bandwidth.

It is another object of the present invention to provide a capacitive-coupled probe and apparatus for measuring the potential of a plasma.

Further objects of the present invention will become more apparent as the detailed description proceeds.

SUMMARY OF THE INVENTION

A capacitive-coupled probe according to the present invention comprises an electrode and a dielectric material disposed about the electrode separating the electrode from a plasma whose potential is being measured.

BRIEF DESCRIPTION OF THE DRAWINGS

Further understanding of the present invention may be best be obtained from consideration of the accompanying drawings wherein:

In FIG. 1, a tube 10 of a dielectric material such as glass has one end thereof elongated to effect a reduced diameter section 12. The end 14 of section 12 is closed and sealed. A cylindrical electrode 16 of a material such as copper is mounted at the end 14 of section 12 within tube 10 and a conductor 18 extends along the length of tube 10 within the interior thereof to contact the electrode 16. An electrical shield 20 is disposed about the conductor 18 along its length and a dielectric material 22, such as glass, is interposed of the shield 20 and the conductor 18.

Figure 1:
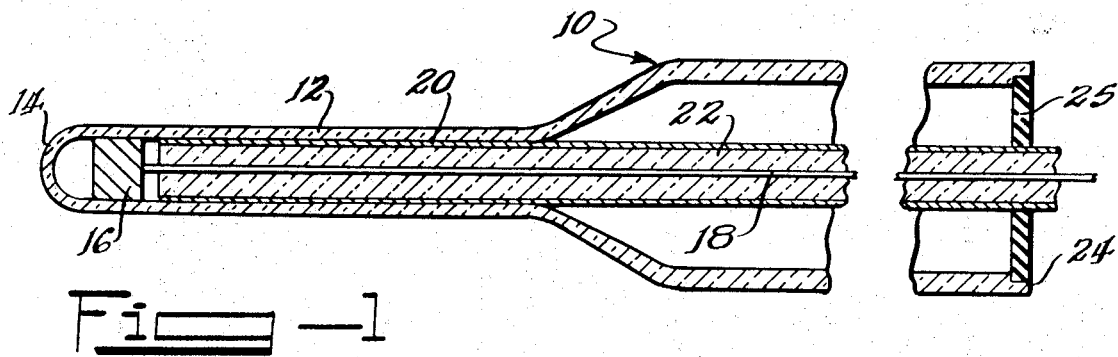
FIG. 1 is a cross section of a probe constructed for the practice of the present invention.

The electrode 16 and preferably the shield 20 are sized to engage the interior of the elongated section 12 to restrain relative motion between the electrode 16 and the tube 10. The opposing end 24 of tube 10 is closed about the shield 20 with a suitable insulating potting material 25 to further restrain relative motion between the conductor 18 and the tube 10.

Figure 2:
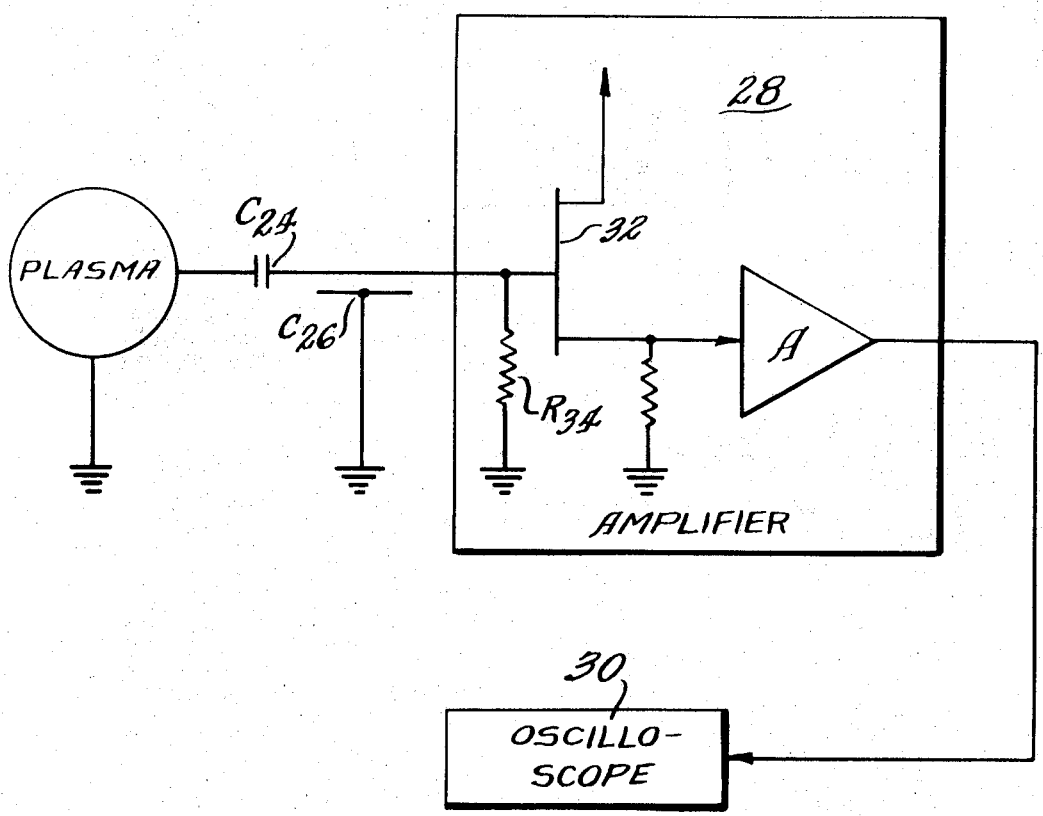
FIG. 2 is an electrical equivalent schematic of the probe of FIG. 1 shown connected to electrical readout circuitry.

Turning to FIG. 2, the electrical equivalency, at low frequencies, for the probe shown in FIG. 1 and described above is illustrated coupled to electrical circuitry for readout of potentials measured by the probe. The capacitance $C_{24}$ represents the capacitive coupling between the electrode 16 and plasma due to separation by the dielectric material of the tube 10. The capacitance $C_{26}$ represents the capacitance of the cable formed by conductor 18 and shield 20 and the input of amplifier 28. The output from the probe is fed via amplifier 28 to an oscilloscope 30.

In operation, the elongated section 12 of the tube 10 extends into the plasma, providing a small probe diameter exposure to the plasma. The dielectric material interposed of the electrode and the plasma creates a capacitive coupling to the plasma wherefrom the plasma potential may be measured. The potential developed across this capacitance is read out via the amplifier 28 and oscilloscope 30.

It will be noted that the capacitive probe according to the present invention is accomplished by separating the electrode 16 from the plasma whose potential is being measured with the tube 10 and the capacitance therefor is determined by the dimensions of the electrode 16 and the elongated section 12 of the tube 10, and the dielectric properties of the glass. To obtain a satisfactory frequency response with the embodiment of FIGS. 1 and 2, the input impedance of the amplifier 28 should be largely capacitive. To effect this, a field-effect-transistor source follower 32 is used as the input to the amplifier 28, as shown.

With the circuit of FIG. 2, the resistance $R_{34}$ gives a DC reference level and its value determines the low-frequency cutoff for the apparatus $f_1=(1/2\pi R_{34}C_{26})$. The attenuation of the probe equals $(C_{24}+C_{26}/C_{24})$. Satisfactory operation may be achieved with the aforedescribed embodiment having the following parameters:

| | |
|---|---|
| External diameter of reduced diameter section 12 | = 1.4 mm. |
| Length of reduced diameter section 12 | = 7 cm. |
| External diameter of tube 10 | = 5.6 mm. |
| Coupling capacitance $C_{24}$ between plasma and electrode | = 0.3 pf. |
| Capacitance $C_{26}$ | = 50 pf. |
| $R_{34}$ | = 50 megohms |
| $f_1$ (low-frequency cutoff) | = 70 Hertz |
| Probe attenuation | = 170. |

In this structure, the cable capacitance should be made as small as possible to minimize attenuation.

At high frequencies, approximately 30 MegaHertz, the probe including the cable formed by the conductor 18 and shield 20 behaves as an interminated transmission line. For good frequency response above 30 MegaHertz, the probe and the cable should be made as short as possible. Thus, with the cable length at a minimum, that is, where the field-effect-transistor source follower 32 is mounted at the end 24 of tube 10, the high-frequency response of the probe is maximized. As previously stated, the value of $R_{34}$ determines the low-frequency response. With $R_{34}$ having a value of $10^9$ ohms and the field-effect-transistor source follower 32 mounted at the end of tube 10, a wide band probe according to the aforedescribed embodiment was effected having a bandwidth of 20 Hertz to over 100 MegaHertz.

With construction as hereinbefore described, a probe is effected which provides minimal size at the point of potential measurement and results in minimal plasma fluctuations therefrom. The impedance of the probe is very high at low frequencies and much higher than the conventional probe at high frequencies. The probe forms a capacitive driver requiring no balancing and possesses a uniform response from a few Hertz to 100 MegaHertz.

Persons skilled in the art will, of course, readily adapt the general teachings of the invention to embodiments far different from the embodiments illustrated. Accordingly, the scope of the protection afforded the invention should not be limited to the particular embodiment illustrated in the drawings and described above, but should be determined only in accordance with the appended claims.

The embodiments of the invention in which an exclusive property or privilege is claimed are defined as follows:

1. As apparatus for measuring potentials in a plasma comprising a dielectric material having an elongated-tube form sealed at one end and engaging said plasma, an electrode of short length relative said dielectric-material tube mounted within said tube at the sealed end thereof to effect a capacitive coupling with said plasma, a conductor disposed within said dielectric-material tube along the length thereof and connected to said electrode, electrical-shield means disposed within said dielectric-material tube about said conductor, said elongated dielectric-material tube being internally sized to provide motive restraint for said electrode and conductor, and means for measuring the potential difference between said electrode and said plasma including a current-conductive return path between said potential measuring means and said plasma.

2. The apparatus according to claim 1 wherein said potential measuring means include capacitive-input amplifier means connected to said conductor.